(12) United States Patent
Aoshima et al.

(10) Patent No.: US 7,763,686 B2
(45) Date of Patent: Jul. 27, 2010

(54) PROCESS FOR PRODUCING POLYALKENYL ETHER

(75) Inventors: Sadahito Aoshima, Toyonaka (JP); Ikuo Nakazawa, Kawasaki (JP); Koichi Sato, Atsugi (JP); Masayuki Ikegami, Atsugi (JP); Shokyoku Kanaoka, Kyotanabe (JP); Tomohide Yoshida, Mito (JP); Yasuhiro Matsuda, Kakogawa (JP); Arihiro Kanazawa, Amagasaki (JP)

(73) Assignees: Canon Kabushiki Kaisha, Tokyo (JP); Nippon Shokubai Co., Ltd., Osaka (JP)

( * ) Notice: Subject to any disclaimer, the term of this patent is extended or adjusted under 35 U.S.C. 154(b) by 776 days.

(21) Appl. No.: 11/213,832

(22) Filed: Aug. 30, 2005

(65) Prior Publication Data
US 2006/0194935 A1   Aug. 31, 2006

(30) Foreign Application Priority Data
Feb. 28, 2005   (JP)   ............................. 2005-054878

(51) Int. Cl.
*C08F 4/06*   (2006.01)
*C08F 16/12*  (2006.01)
*C08F 12/28*  (2006.01)

(52) U.S. Cl. .................. 526/95; 526/131; 526/126; 526/135; 526/154; 526/172; 526/332; 526/310

(58) Field of Classification Search .................. 526/95, 526/131, 126, 135, 154, 172, 317, 310, 332
See application file for complete search history.

(56) References Cited

U.S. PATENT DOCUMENTS

| 3,468,856 | A | 9/1969 | Asai et al. | |
|---|---|---|---|---|
| 7,157,539 | B2 * | 1/2007 | Sato et al. | 526/334 |
| 2003/0232904 | A1 | 12/2003 | Sato et al. | 523/160 |
| 2005/0037160 | A1 | 2/2005 | Suda et al. | |
| 2006/0079603 | A1 | 4/2006 | Sato et al. | 523/160 |

FOREIGN PATENT DOCUMENTS

| JP | 44-030742 A | 12/1969 |
|---|---|---|
| JP | 2004-018572 A | 1/2004 |
| WO | 03/074609 A1 | 9/2003 |
| WO | WO 2005/033160 A1 | 4/2005 |
| WO | WO 2005/044883 A1 | 5/2005 |

OTHER PUBLICATIONS

Tomohide Yoshida et al., "Fast Living Cationic Polymerization of Vinyl Ethers with Polar Groups in the Pendant-Design of Lewis Acid Catalyst Systems Effective for the Polymerization of Polar Monomers," The 53rd Polymer Symposium, Center for Research and Development in Higher Education, Hokkaido University, Sep. 15-17, 2004, vol. 53, No. (2), *Polymer Reprints*, pp. 2430-31 (w/ translation). (2004).

Request for Certification (LCD) (Sep. 16, 2004) (w/ translation).

Tomohide Yoshida et al., "Fast Living Cationic Polymerization Accelerated by $SnCl_4$. I. New Base-Stabilized Living System for Various Vinyl Ethers with $SnCl_4/EtAlCl_2$," 43(2) *J. Polym. Sci.* 468-72 (2005).

Sadahito Aoshima et al., "Recent Progress in Cationic Polymerization: Living Polymerization and Well-Defined Polymers with Various Shapes and Functions," 40(10) *J. Adhesion Soc. Jap.* 446-54 (2004) (w/translation).

Masaaki Miyamoto et al., "Living Polymerization of Isobutyl Vinyl Ether with the Hydrogen Iodide/Iodine Initiating System", 17(3) *Macromol.* 265-68 (Mar. 1984).

Sadahito Aoshima et al., "Living Cationic Polymerization of Vinyl Monomers by Organoaluminium Halides 1. $EtAlCl_2/Ester$ Initiating Systems for Living Polymerization of Vinyl Ethers," 15 *Polymer Bulletin* 417-23 (1986).

Toshinobu Higashimura et al., "Living Cationic Polymerization of Styrene: New Initiating Systems Based on Added Halide Salts and the Nature of the Growing Species," 26 *Macromol.* 744-51 (1993).

Masami Kamigaito et al., "Living Cationic Polymerization of Isobutyl Vinyl Ether by Protonic Acid/Zinc Halide Initiating Systems: Evidence for the Halogen Exchange with Zinc Halide in the Growing Species," 25 *Macromol.* 2587-91 (1992).

Pierre Laszlo et al., "Determination of the Acidity of Lewis Acids," 112 *J. Am. Chem. Soc.* 8750-54 (1990).

Tse-Lok Ho, "The Hard Soft Acids Bases (HSAB) Principle and Organic Chemistry," 75 (1) *Chem. Rev.* 1-20 (Feb. 1975).

Mitsuo Sawamoto et al., "The Nature of the Growing Species in Living Cationic Polymerization: Principals, Stereochemistry and in-situ NMR Analysis," 85 *Macromol. Symp.* 33-43 (1994).

* cited by examiner

*Primary Examiner*—William K Cheung
(74) *Attorney, Agent, or Firm*—Fitzpatrick, Cella, Harper & Scinto

(57) ABSTRACT

Polyalkenyl ether is produced by polymerizing alkenyl ether represented by the following general formula (I):

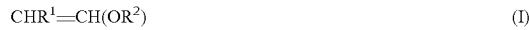

$$CHR^1=CH(OR^2) \qquad (I)$$

wherein $R^1$ represents a hydrogen atom or a methyl group, $R^2$ represents a monovalent organic group, and $R^2$ contains a silicon atom or at least one atom selected from the group consisting of elements from group 15 to group 17, in the presence of a halide of an element other than Al, or an organometallic compound of an element other than Al, and a nonionic oxygen-containing or nonionic nitrogen-containing organic compound.

7 Claims, No Drawings

PROCESS FOR PRODUCING POLYALKENYL ETHER

BACKGROUND OF THE INVENTION

1. Field of the Invention

The present invention relates to a process for producing polyalkenyl ether.

2. Related Background Art

Conventionally, polymers of alkenyl ether have been attained from cationic polymerization. In cationic polymerization, transfer and termination usually tend to occur easily, rendering it difficult to form a polymer or block copolymer having a narrow molecular weight distribution. However, Higashimura, Sawamoto et al. discovered the following matters relating to the use of an initiator consisting of HI and $I_2$. That is, they discovered that alkenyl ethers allow living growth, and, that alkenyl ethers can form a polymer or block copolymer having a narrow molecular weight distribution (Macromolecules, Volume 17, 1984, p. 265-268).

Higashimura, Aoshima et al. further discovered a synthesis process for cationic living polymerization of such alkenyl ethers from a Lewis acid and an added base (Polymer Bulletin, Volume 15, 1986, p. 417). Other known examples include an HCl/SnCl$_4$ system (Macromolecules, Volume 26, 1993, p. 744 and "Macromol. Symp.," 85, p. 33-43, 1994) and an HCl/ZnCl$_2$ system (Macromolecules, Volume 25, 1992, p. 2587).

According to such cationic living polymerization processes, a macromolecule compound having a variety of repeating unit structures can be attained by conducting polymer synthesis. In other words, polyalkenyl ether polymer such as a homopolymer and a copolymer consisting of two or more monomer components, as well as a block copolymer, graft polymer and gradient polymer can be attained. Furthermore, it is now becoming possible to synthesize these polymers having a degree of polymerization controlled to a certain extent of precision. However, the fact still remains that further improvements in living polymerization are required in order to expand the degree of freedom of polymer molecule design and increase productivity through improvements in polymerization rate and controllability.

In particular, when polymerizing alkenyl ether represented by the following general formula (I):

$$CHR^1=CH(OR^2) \quad (I)$$

wherein $R^1$ represents a hydrogen atom or a methyl group, $R^2$ represents a monovalent organic group, and $R^2$ contains a silicon atom or at least one atom selected from the group consisting of elements from group 15 to group 17, a considerable amount of time is required. It is thus desired to shorten this polymerization time.

SUMMARY OF THE INVENTION

The present invention has been created in view of the above-described related background art. It is an object of the present invention to provide a process for producing polyalkenyl ether having a narrow molecular weight distribution in a short amount of time and with good productivity. It is also an object of the present invention to provide a process for producing polyalkenyl ether based on improved living cationic polymerization.

The present inventors arrived at the present invention as a result of intensive research into the above-described problems. A first aspect of the present invention is directed to a process for producing polyalkenyl ether comprising polymerizing alkenyl ether represented by the following general formula (I):

$$CHR^1=CH(OR^2) \quad (I)$$

wherein $R^1$ represents a hydrogen atom or a methyl group, $R^2$ represents a monovalent organic group, and $R^2$ contains a silicon atom or at least one atom selected from the group consisting of elements from group 15 to group 17, in the presence of a halide of an element other than Al, or an organometallic compound of an element other than Al, and a nonionic oxygen-containing or nonionic nitrogen-containing organic compound.

A second aspect of the present is directed to a process for producing polyalkenyl ether comprising polymerizing alkenyl ether represented by the following general formula (II):

$$CHR^1=CH(OR^2) \quad (II)$$

wherein $R^1$ represents a hydrogen atom or a methyl group, and $R^2$ represents a monovalent organic group, using a cation source in the presence of first and second Lewis acids and an oxygen-containing or nitrogen-containing organic compound, wherein the first Lewis acid is introduced into a system, and the second Lewis acid is introduced into the system simultaneously or later.

According to the production process in accordance with the present invention, polyalkenyl ether having a narrow molecular weight distribution can be produced in a shorter time than that of the conventional processes. That is, a macromolecule which conventionally had an extremely low polymerization rate and required a considerable amount of time for production can be easily produced. Furthermore, a variety of copolymers, for instance block copolymers, can be produced easily and in a short amount of time. The present invention will produce prominent effects that have a large industrial value.

In addition to ink production, the production process according to the present invention can also be employed in the production of articles using various kinds of polymers.

DESCRIPTION OF THE PREFERRED EMBODIMENTS

The present invention will now be explained in more detail.

A first aspect of the present invention is directed to a process for producing polyalkenyl ether by polymerizing alkenyl ether represented by the following general formula (I):

$$CHR^1=CH(OR^2) \quad (I)$$

wherein $R^1$ represents a hydrogen atom or a methyl group, $R^2$ represents a monovalent organic group, and $R^2$ contains a silicon atom or at least one atom selected from the group consisting of elements from group 15 to group 17, in the presence of a halide of an element other than Al, or an organometallic compound of an element other than Al, and a nonionic oxygen-containing or nonionic nitrogen-containing organic compound.

While ether compounds and carbonyl-group-containing organic compounds are typical examples of an oxygen-containing organic compound, further examples include ethers such as tetrahydrofuran and dioxane, esters, acid anhydrides, ketones, imides and the like.

Examples of an ester include ethyl acetate, butyl acetate, phenyl acetate, ethyl butyrate, ethyl chloroacetate, ethyl stearate, ethyl benzoate, phenyl benzoate, diethyl phthalate, diethyl isophthalate and the like. Examples of an acid anhydride include, for instance, acetic anhydride. Examples of a ketone include acetone, methyl ethyl ketone and the like. Examples of an imide include ethylphthalimide and the like. Examples of a nitrogen-containing compound include pyridine derivatives such as 2,6-dimethylpyridine, amides such as N,N-dimethylacetamide and amines such as triethylamine. The oxygen-containing compound or the nitrogen-containing compound is not restricted to these compounds described above. These oxygen-containing or nitrogen-containing compounds may be used singly or in combination of two or more together.

While the amount to be used of these compounds is not particularly restricted, if the amount to be used of the alkenyl ether represented by the general formula (I) of the raw material monomer according to the present invention is abbreviated as [I], the amount can be set in the following manner. That is, [I]/[oxygen-containing or nitrogen-containing compound] is preferably set to be greater than or equal to 0.1 (molar ratio). When [I]/[oxygen-containing or nitrogen-containing compound] is less than 0.1 (molar ratio), in some cases it is difficult for the polymerization process system according to the present invention to be a complete living system. The amount to be used in the process according to the present invention is preferably [I]/[oxygen-containing or nitrogen-containing compound]$\geq$0.3 (molar ratio), and especially preferably [I]/[oxygen-containing or nitrogen-containing compound]$\geq$0.4 (molar ratio).

If such oxygen-containing or nitrogen-containing compound is not used, polymerization may involve transfer and termination in a typical manner. However, if a monomer compound retaining an ether structure, an ester structure or an amine structure etc. as a functional group is used in a sufficient amount, in some cases it is possible for the monomer compound to be made to act as a substitute compound for the oxygen-containing or nitrogen-containing compound.

Examples of a halide of an element other than aluminum or an organometallic compound of an element other than Al used in the present invention include a halide of B, Mg, Si, P or an element of the fourth period or higher, or an organometallic compound of these elements. These compounds are Lewis acids, and may be used singly or in combination of two or more together.

Here, "element of the fourth period or higher" refers to elements of the fourth period or higher in the periodic table, and preferable elements include Ti, Zr, Hf, V, Nb, Ta, Cr, Mo, W, Fe, Mn, Co, Ni, Pd, Rh, Ru, Cu, Zn, Ag, Au, Sn, Sb, Tl, Hg, Y, Yb, Sc, Ga, In, Re, and Bi. Specific examples of Lewis acids include $TiCl_3$, $TiCl_4$, $TiBr_3$, $TiBr_4$, $ZrCl_4$, $ZrBr_4$, $HfBr_4$, $HfCl_4$, $VCl_4$, $VCl_5$, $VBr_4$, $VBr_5$, $NbCl_5$, $NbBr_5$, $TaCl_5$, $TaBr_4$, $CrCl_3$, $CrCl_2$, $MoCl_5$, $MoCl_3$, $WCl_6$, $WCl_5$, $FeCl_2$, $FeCl_3$, $CoCl_2$, $CoBr_2$, $CoCl_3$, $NiBr_2$, $NiCl_2$, $PdCl_2$, $CuCl_2$, $CuBr_2$, $AgCl$, $AuCl_2$, $SnCl_4$, $SnBr_4$ and the like.

While the amount to be used of these compounds is not particularly restricted, if the amount to be used of the alkenyl ether represented by the general formula (I) of the raw material monomer according to the present invention is abbreviated as [I], the amount can be set in the following manner. That is, [I]/[halide of an element having an atomic number of 14 or more] is preferably set to be in the range of from 2 to 10,000 (molar ratio), and more preferably in the range of from 10 to 1,000. Obviously, an aluminum compound can be used together with these compounds.

Due to the fact that an oxygen-containing or nitrogen containing-compound acts as a Lewis base, the combination of a Lewis acid and an oxygen-containing or nitrogen-containing-compound is preferably used in a manner which balances the acidity and basicity of the two substances. Typical combinations include a case in which ethyl acetate is used with $SnCl_4$, and a case in which THF (tetrahydrofuran) is used with $FeCl_3$. Regarding the strength and hardness of Lewis acids, fixed concepts have been formed within the organic and inorganic chemistry academic fields. For example, P. Laszlo, et al., "J. Am. Chem. Soc.", 1990, 112, 8750 or Ho, T. L., et al., "Chem. Rev.", 1975, 75, 1-20 disclose the strength of Lewis acids.

Representative examples of the polymerization initiator include substances derived from the combination of an above-described Lewis acid and a cation source, or from a proton acid alone. The term "cation source" indicates a compound capable of generating initiator cations. Examples of the former include a combination of a Lewis acid with a proton acid such as hydrogen chloride and acetic acid, water, alcohols, halides, hydrogen halides or an adduct of a carboxylic acid and vinyl ether. Examples of the latter include hydrogen chloride, sulfuric acid, alkyl sulfonic acid, a halogen-substituted carboxylic acid, a halogen-substituted alkyl sulfonic acid, halogenosulfonic acid, perchloric acid and the like. More preferable is the former case, wherein representative examples include an adduct of acetic acid and vinyl ether, and an adduct of hydrogen chloride and vinyl ether with the Lewis acid.

The alkenyl ether which is the raw material monomer according to the present invention is expressed by the above-described general formula (I), wherein $R^1$ represents a hydrogen atom or a methyl group, and $R^2$ represents a monovalent organic group, and $R^2$ contains a silicon atom or at least one atom selected from the group consisting of elements from group 15 to group 17. Representative examples of such an atom include an oxygen atom, sulfur atom, nitrogen atom, phosphorus atom and silicon atom. Specific examples of $R^2$ include an alkyloxyalkyl group, an aryloxyalkyl group, an alkylaminoalkyl group, an amide-substituted alkyl group, a carboxylic acid ester-substituted alkyl group, a carboxylic acid ester-substituted alkyloxyalkyl group, a carboxylic acid or sulfonic acid ester-substituted aryloxyalkyl group, a (meth)acrylic acid ester-substituted alkyl group, a silyloxyalkyl group and the like. These examples may also possess a structure which is further substituted with some other functional group. The present invention can polymerize these variously structured alkenyl ethers with good control, at a fast rate and with high productivity.

In the polymerization process according to the present invention, so-called "solution polymerization" which uses a solvent is acceptable, as is a process which does not use a solvent. Examples of solvents which can be used include water, alcohols, ethers, esters, amides and aromatic or aliphatic hydrocarbon-based solvents, halogen-substituted alkyls and the like. However, aprotonic solvents are preferable, for example toluene, THF, alkanes (normal-hexane, cyclohexane, pentane, heptane etc.), DMF, ethers, esters, halogenated alkyls and the like. The solvent may be used instead of or in combination with the oxygen-containing or nitrogen containing-compound specifically used in the present invention.

A preferable embodiment according to the first aspect of the present invention will now be described.

Alkenyl ether represented by the general formula (I), ethyl acetate, and as a cation source an adduct of hydrogen chloride and isobutyl vinyl ether are introduced into a toluene solvent in a reaction apparatus under a dry nitrogen atmosphere. Next, a polymerization reaction is initiated by charging the resulting mixture with tin tetrachloride. After a certain period of time, the reaction is terminated by adding a polymerization terminator such as a solution of ammonia in methanol or similar. Solvent etc. is removed from the yielded reaction solution by an isolation treatment, whereby the polymer can be liberated.

Compared with a conventional process, the polymerization process in the process according to the present invention is able to greatly speed up the rate of the polymerization reaction while maintaining highly controlled living polymerizability. In particular, the polymerization rate of a monomer having silicon or an element from groups 15 to 17 on a side chain is generally comparatively low. In the present invention, even when polymerizing a monomer which has such a slow polymerization reaction, a polymer having extremely good molecular weight dispersion can be synthesized at an extremely fast polymerization rate with good control.

A second aspect according to the present invention is directed to a process for producing polyalkenyl ether comprising polymerizing alkenyl ether represented by the following general formula (II):

$$CHR^1=CH(OR^2) \qquad (II)$$

wherein $R^1$ represents a hydrogen atom or a methyl group, and $R^2$ represents a monovalent organic group, using a cation source in the presence of two Lewis acids and an oxygen-containing or nitrogen-containing organic compound, wherein a first Lewis acid is introduced into a system, and a second Lewis acid is introduced into the system simultaneously or later.

The cation source is a compound capable of generating initiator cations. The cation source is usually used in combination with a Lewis acid. Examples include proton acid such as hydrogen chloride or acetic acid, water, alcohols, halides, hydrogen halides or an adduct of carboxylic acid and vinyl ether. A Lewis acid which easily generates cations from the cation source is preferably used the first Lewis acid.

Examples of the two Lewis acids used in the present invention include halides of magnesium, boron, aluminum, silicon, phosphorus as well as elements of the fourth period or higher, and organometallic compounds of these elements. Of these, preferable examples of the first Lewis acid include halides of magnesium, boron, aluminum, silicon and phosphorus or organometallic compounds of these elements. Preferable examples of the second Lewis acid include halides of elements of the fourth period or higher, and organometallic compounds of these elements.

The above-described first Lewis acid is more preferably an organoaluminum compound represented by the following general formula (III):

$$R^3{}_m AlX_n \qquad (III)$$

wherein $R^3$ represents a monovalent organic group and X represents a halogen atom, in which m and n are expressed by $m+n=3$, and, $0 \leq m \leq 3$ and $0 \leq n \leq 3$.

In the organoaluminum compound represented by the above general formula (III), $R^3$ represents a monovalent organic group. Specific examples thereof include an alkyl group, aryl group, aralkyl group, alkenyl group, alkoxy group and the like, although $R^3$ is not particularly restricted thereto. Further, X represents a halogen atom, wherein m and n are expressed by $m+n=3$, and, $0 \leq m \leq 3$ and $0 \leq n \leq 3$.

Specific examples of such an organoaluminum compound include diethylaluminum chloride, diethylaluminum bromide, diisobutylaluminum chloride, diethylaluminum hydride, methylaluminum sesquichloride, ethylaluminum sesquichloride, ethylaluminum sesquibromide, isobutylaluminum sesquichloride, methylaluminum dichloride, ethylaluminum dichloride, ethylaluminum dibromide, ethylaluminum diiodide, ethylaluminum difluoride, isobutylaluminum dichloride, octylaluminum dichloride, ethoxyaluminum dichloride, vinylaluminum dichloride, phenylaluminum dichloride, aluminum trichloride, aluminum tribromide and similar compounds.

When in the present invention these organoaluminum compounds are a mixture of two or more compounds, as a Lewis acid, the mixture is considered as one kind. Representative examples include ethylaluminum sesquichloride, which is an equimolar mixture of diethylaluminum chloride and ethylaluminum dichloride and is considered as one kind.

The second Lewis acid preferably includes a compound containing an element of the fourth period or higher in the periodic table, Ti, Zr, Hf, V, Nb, Ta, Cr, Mo, W, Fe, Mn, Co, Ni, Pd, Rh, Ru, Cu, Zn, Ag, Au, Sn, Sb, Tl, Hg, Y, Yb, Sc, Ga, In, Re, and Bi. Specific examples of such compounds include $TiCl_3$, $TiCl_4$, $TiBr_3$, $TiBr_4$, $ZrCl_4$, $ZrBr_4$, $HfBr_4$, $HfCl_4$, $VCl_4$, $VCl_5$, $VBr_4$, $VBr_5$, $NbCl_5$, $NbBr_5$, $TaCl_5$, $TaBr_4$, $CrCl_3$, $CrCl_2$, $MoCl_5$, $MoCl_3$, $WCl_6$, $WCl_5$, $FeCl_2$, $FeCl_3$, $CoCl_2$, $CoBr_2$, $CoCl_3$, $NiBr_2$, $NiCl_2$, $PdCl_2$, $CuCl_2$, $CuBr_2$, $AgCl$, $AuCl_2$, $SnCl_4$, $SnBr_4$ and the like.

While ether compounds and carbonyl-group-containing organic compounds are typical examples of an oxygen-containing compound, further examples include ethers such as tetrahydrofuran and dioxane, esters, acid anhydrides, ketones, imides and the like. Examples of an ester includes ethyl acetate, butyl acetate, phenyl acetate, ethyl butyrate, ethyl chloroacetate, ethyl stearate, ethyl benzoate, phenyl benzoate, diethyl phthalate, diethyl isophthalate and the like. Examples of an acid anhydride include, for instance, acetic anhydride. Examples of a ketone include acetone, methyl ethyl ketone and the like. Examples of an imide include ethylphthalimide and the like.

While compound examples of a nitrogen-containing compound include pyridine derivatives such as 2,6-dimethylpyridine, amides such as N,N-dimethylacetamide and amines such as triethylamine, the oxygen-containing compound or the nitrogen-containing compound are not restricted to these compounds described above. These oxygen-containing or nitrogen-containing compounds may be used singly or in combination of two or more together.

While the amount to be used of these compounds is not particularly restricted, if the amount to be used of the alkenyl ether represented by the general formula (I) of the raw material monomer according to the present invention is abbreviated as [I], the amount can be set in the following manner. That is, [I]/[oxygen-containing or nitrogen-containing compound] is preferably set to be greater than or equal to 0.1 (molar ratio). When [I]/[oxygen-containing or nitrogen-containing compound] is lower than 0.1 (molar ratio), in some cases it is difficult for the polymerization process system according to the present invention to be a complete living system. The amount to be used in the process according to the present invention is preferably [I]/[oxygen containing or nitrogen containing compounds]$\geq 0.3$ (molar ratio), and especially preferably [I]/[oxygen containing or nitrogen containing compounds]$\geq 0.4$ (molar ratio). If such oxygen-containing or nitrogen-containing compound is not used, there is a possibility that ordinary polymerization with its associated transfer and termination will occur. However, if a monomer compound retaining an ether structure, an ester structure or an amine structure etc. as a functional group is used in a sufficient amount, in some cases it is possible for the monomer compound to be made to act as a substitute compound for the oxygen-containing or nitrogen-containing compound.

While the amount to be used of the first Lewis acid is not particularly restricted, if the amount to be used of the alkenyl ether represented by the general formula (I) of the raw material monomer according to the present invention is abbreviated as [I], the amount can be set in the following manner. That is, [I]/[Lewis acid] is preferably set to be in the range of from 2 to 10,000 (molar ratio), and more preferably in the range of from 10 to 1,000. Further, the amount to be used of the second Lewis acid is not particularly restricted. If the amount to be used of the alkenyl ether represented by the general formula (I) of the raw material monomer according to the present invention is abbreviated as [I], the amount can be set in the following manner. That is, [I]/[Lewis acid] is preferably set to be in the range of from 2 to 10,000 (molar ratio), and more preferably in the range of from 10 to 1,000.

As explained for the first aspect of the present invention, there are preferable combinations of the second Lewis acid and the oxygen-containing or nitrogen-containing compound. Typical combinations include ethyl acetate used with $SnCl_4$, and THF (tetrahydrofuran) used with $FeCl_3$.

In the polymerization process according to the present invention, so-called "solution polymerization" which uses a solvent is acceptable, as is a process which does not use a solvent. As a solvent, aprotonic solvents are preferable, for example toluene, THF, alkanes (normal-hexane, cyclohexane, pentane, heptane etc.), DMF, ethers, esters, halogenated alkyls and the like. A solvent characteristically used in the above-described present invention can be used instead of or in combination with the oxygen-containing or nitrogen containing-compound.

A preferable embodiment according to the second aspect of the present invention will now be described.

Ethyl acetate and an adduct of acetic acid and isobutylvinyl ether as a cation source are introduced into a toluene solvent in a reaction apparatus under a dry nitrogen atmosphere. Next, a polymerization reaction is initiated by charging the resulting mixture with ethylaluminum sesquichloride. If this solution is charged simultaneously, or after some time has passed, with alkenyl-ether and tin tetrachloride, which is the second Lewis acid, polymerization is initiated having a high reaction rate. After a certain period of time, the reaction is terminated by adding a polymerization terminator such as a solution of ammonia in methanol or similar. Solvent etc. is removed from the yielded reaction solution by an isolation treatment, whereby the polymer can be liberated.

Compared with a conventional process, the polymerization process in the process according to the present invention is able to greatly speed up the rate of the polymerization reaction while maintaining highly controlled living polymerizability. Even when polymerizing a monomer having a carbonyl structure or nitrogen-containing structure on a side chain which has a comparatively small polymerization rate (i.e. the polymerization reaction is slow), a polymer having extremely good molecular weight dispersion can be synthesized at an extremely fast polymerization rate with good control.

It should be noted that the present invention encompasses a process for producing a block copolymer by the above-described process.

Further, the present invention encompasses a process for producing polyalkenyl ether having an ionic repeating structure which employed the above-described process.

The alkenyl ether serving as the raw material in the two processes according to the present invention that have been described above will now be explained. The alkenyl ether used in the present invention can be represented by the above-described general formulae (I) or (II). Structural examples of the alkenyl ether represented by general formula (I) are as follows.

$CH_2=CH-O-CH_2-CH_2-O-Ph$ (I-a)

$CH_2=CH-O-CH_2-CH_2-O-Ph-Ph$ (I-b)

$CH_2=CH-O-CH_2-CH_2-O-Ph-CH_3$ (I-c)

$CH_2=CH-O-CH_2-CH(CH_3)_2$ (I-d)

$CH_2=CH-O-CH_2-CH_2-O-CH_3$ (I-e)

$CH_2=CH-O-CH_2-CH_2-O-C_2H_5$ (I-f)

(I-g)

$CH_2=CH-O-CH_2-CH_2-O-CH_2-CH_2-O-CH_3$ (I-h)

$CH_2=CH-O-CH_2-CH_2-O-CH_2-CH_2-O-CH_2-CH_2-O-CH_3$ (I-i)

$CH_2=CH-O-CH_2-CH_2-O-Si(CH_3)_2tBu$ (I-j)

$CH_2=CH-O-CH_2-CH_2-O-Ph-COOC_2H_5$ (I-k)

$CH_2=CH-O-CH_2CH_2-Cl$ (I-l)

$CH(CH_3)=CH-O-CH-(CH_3)_2$ (I-m)

$CH(CH_3)=CH-O-CH_2-CH_2-O-C_2H_5$ (I-n)

$CH(CH_3)=CH-O-CH_2-Ph$ (I-o)

$CH_2=CH-O-CH_2-Ph$ (I-p)

$CH_2=CH-O-CH_2CH_2-O-COCH_3$ (I-q)

$CH_2=CH-O-CH_2CH_2CH(COOC_2H_5)_2$ (I-r)

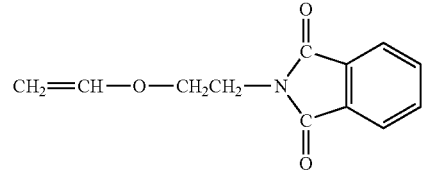

While the alkenyl ether represented by general formula (II) encompasses the alkenyl ether represented by general formula (I), general formula (II) expresses an alkylvinyl ether as a unique alkenyl ether.

According to the production process of the present invention, a very broad range of alkenyl ethers having an organic group, namely a side-chain chemical structure, can be converted to polyalkenyl ether rapidly and with good control. Examples of the organic group include an alkyl group, aryl group, aralkyl group, alkoxyalkyl group, and aryloxyalkyl group. Present among these are compounds which turn into so-called stimulus-responsive multifunctional polymers which manifest temperature sensitivity when converted to a polymer. In addition, alkenyl ethers in a form which is protected by an ester or a silyl ether, which belong to a category in which the ordinary polymerization reaction rate is comparatively slow, can also be converted to polyalkenyl ether rapidly and with good control. According to the present invention, such alkenyl ethers having a variety of chemical structures can be converted to polyalkenyl ether rapidly and with good control, whereby it becomes possible to freely produce a polymer having functions such as temperature-sensitivity, ionicity, high amphiphilicity, high hydrophilicity, photosensitivity and cross-linking properties. In such a case, it is sometimes necessary to transform into a structure having the desired functions by deprotecting the protective group. In particular, carboxylic acid or sulfonic acid ester can be transformed into an ionic (in this case anionic) functional group by deprotecting the carboxylic acid or sulfonic acid ester through hydrolysis and then making the resulting product alkaline. Ionic groups such as an ammonium cation can also be introduced. Thus, a polymeric compound having an ionic functional group as a repeating unit can be easily produced by employing a protective-group-containing monomer, or directly polymerizing a monomer having an ionic functional group.

In the same manner, alkenyl ether having a non-cationic polymerizable (the exemplified compounds are polymerizable with a radical or an anion) functional group can also be converted to polyalkenyl ether rapidly and with good control. Practical examples of a radical polymerizable or anion polymerizable reactive group include a (meth)acryloyl group, (meth)acrylamide group, malate group, fumalate group and maleimide group.

A monomer further comprising, in addition to an alkenyl ether group, a reactive unsaturated bond which essentially has radical polymerizability and/or anion polymerizability can be copolymerized with another alkenyl ether compound. The process for polymerization can include random polymerization or block copolymerization.

Polymerizing a monomer further comprising, in addition to an alkenyl group, a reactive unsaturated bond which essentially has radical polymerizability and/or anion polymerizability allows a polymer to be obtained which has an unsaturated bond on a side chain. For example, a radical polymerizable resin composition can be obtained by using a mixture of a polymer having a radical polymerizable unsaturated bond on such a side chain with a radical polymerizable monomer.

In the present invention, the above-described alkenyl ether compound is preferably an ester represented by the following general formula (IV):

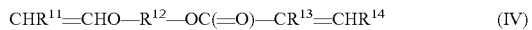

$$CHR^{11}=CHO—R^{12}—OC(=O)—CR^{13}=CHR^{14} \quad (IV)$$

The compound represented by general formula (IV) is not particularly restricted as long as such compound further comprises in the molecule an unsaturated bond other than alkenyl ether group, and as long as such compound satisfies the following conditions. Namely, that the compound is constituted such that the substituent represented by $R^{11}$ is a hydrogen atom or methyl group, the substituent represented by $R^{12}$ is an organic group, the substituent represented by $R^{13}$ is a hydrogen atom or methyl group, and the substituent represented by $R^{14}$ is a hydrogen atom or organic group. In the present invention, the "organic group" in the compounds represented by the general formulae indicates an organic group bonded to the basic structure constituting the compound in question.

In general formula (IV) according to the present invention, the organic group represented by $R^{12}$ is not particularly restricted. Examples thereof include a linear chain, branched or cyclic alkylene group having from 2 to 30 carbons, an alkylene group having from 2 to 30 carbons and having an oxygen atom in its structure by an ether bond and/or an ester bond, and an aromatic group having from 6 to 11 carbons, which may be substituted. Among these, an alkylene group having from 2 to 6 carbons and an alkylene group having from 2 to 10 carbons and having an oxygen atom in its structure by an ether bond may be preferably used.

Compounds of the general formula (IV), wherein $R^{11}$ and $R^{14}$ are substituted with hydrogen atoms, are vinyl ether-containing (meth)acrylic acid. Representative examples thereof specifically include the following compounds, but are not particularly limited thereto.

(1) 2-vinyloxyethyl(meth)acrylate, 3-vinyloxypropyl(meth)acrylate, 1-methyl-2-vinyloxyethyl(meth)acrylate, 2-vinyloxypropyl(meth)acrylate, 4-vinyloxybutyl(meth)acrylate, 1-methyl-3-vinyloxypropyl(meth)acrylate, 1-vinyloxypropyl(meth)acrylate, 2-methyl-3-vinyloxypropyl(meth)acrylate, 1,1-dimethyl-2-vinyloxyethyl(meth)acrylate, 3-vinyloxybutyl(meth)acrylate, 1-methyl-2-vinyloxypropyl(meth)acrylate, 2-vinyloxybutyl(meth)acrylate, 4-vinyloxycyclohexyl(meth)acrylate, 6-vinyloxyhexyl(meth)acrylate, 4-vinyloxymethylcyclohexylmethyl(meth)acrylate, 3-vinyloxymethylcyclohexylmethyl(meth)acrylate, 2-vinyloxymethylcyclohexylmethyl(meth)acrylate, p-vinyloxymethylphenylmethyl(meth)acrylate, m-vinyloxymethylphenylmethyl(meth)acrylate, o-vinyloxymethylphenylmethyl(meth)acrylate.

(2) 2-(vinyloxyethoxy)ethyl(meth)acrylate, 2-(vinyloxyisopropoxy)ethyl(meth)acrylate, 2-(vinyloxyethoxy)propyl(meth)acrylate, 2-(vinyloxyethoxy)isopropyl(meth)acrylate, 2-(vinyloxyisopropoxy)propyl(meth)acrylate, 2-(vinyloxyisopropoxy)isopropyl(meth)acrylate, 2-(vinyloxyethoxyethoxy)ethyl(meth)acrylate, 2-(vinyloxyethoxyisopropoxy)ethyl(meth)acrylate, 2-(vinyloxyisopropoxyethoxy)ethyl(meth)acrylate, 2-(vinyloxyisopropoxyisopropoxy)ethyl(meth)acrylate, 2-(vinyloxyethoxyethoxy)propyl(meth)acrylate, 2-(vinyloxyethoxyisopropoxy)propyl(meth)acrylate, 2-(vinyloxyisopropoxy)ethoxypropyl(meth)acrylate, 2-(vinyloxyisopropoxyisopropoxy)propyl(meth)acrylate, 2-vinylethoxyethoxy)isopropyl(meth)acrylate, 2-(vinyloxyethoxyisopropoxy)isopropyl(meth)acrylate, 2-(vinyloxyisopropoxyethoxy)isopropyl(meth)acrylate, 2-(vinyloxyisopropoxyisopropoxy)isopropyl(meth)acrylate, 2-(vinyloxyethoxyethoxyethoxy)ethyl(meth)acrylate, (vinyloxyethokyethoxyethoxyethoxy)ethyl(meth)acrylate, 2-(isopropoxyethoxyethoxy)ethyl(meth)acrylate, polyethyleneglycolmonovinylether(meth)acrylate, polypropyleneglycolmonovinylether(meth)acrylate.

Preferable among these are, 2-vinyloxyethyl(meth)acrylate, 3-vinyloxypropyl(meth)acrylate, 1-methyl-2-vinyloxyethyl(meth)acrylate, 2-vinyloxypropyl(meth)acrylate, 4-vinyloxybutyl(meth)acrylate, 4-vinyloxycyclohexyl(meth)acrylate, 6-vinyloxyhexyl(meth)acrylate, 4-vinyloxymethylcyclohexylmethyl(meth)acrylate, 2-(vinyloxyethoxy)ethyl(meth)acrylate, 2-(vinyloxyethoxyethoxy)ethyl(meth)acrylate and 2-(vinyloxyisopropoxy)propyl(meth)acrylate.

Other specific examples include 2-vinyloxyethyl sorbate and 2-vinyloxyethyl cinnamate.

The synthesized polymer can be a synthesized homopolymer from one kind of monomer, or can be a copolymerized polymer synthesized by polymerizing two or more monomers together. Since the controllability of the process according to the present invention is extremely high, a block copolymer can be synthesized with good control by successively polymerizing different monomer species. It can therefore be said that the synthesis of a copolymer is one preferable embodiment in the present invention. According to the present invention, a graft polymer can obviously also be synthesized.

A process for synthesizing a block copolymer, which is one of the preferable embodiments according to the present invention, will now be described. Compared with producing a block copolymer by a conventional process, using the first aspect or the second aspect of the present invention allows for the block copolymer to be produced at an extremely rapid rate as a result of the characteristics of the present invention being exhibited. If there is a large difference in the reaction rates of the alkenyl ether monomers which constitute each block segment when obtaining the block copolymer, a polymerization process which combines in particular the two Lewis acids in the present invention is effective.

For example, for an AB diblock copolymer, in the presence of an oxygen-containing or nitrogen-containing compound, after A block copolymerization is completed by polymerizing the A blocks using the first Lewis acid, polymerization of the B blocks is continued. During this process, if there is a large difference in the polymerization rate of the monomers which constitute the A component and the B component, wherein the B component polymerization rate is slow, in some cases a considerable length of time is required for the growth of the B segment. There is the possibility that on occasion the reaction will be deactivated. In such cases, a Lewis acid different from that during A block copolymerization and which is preferably a metal halide or organometallic compound consisting of elements of the fourth period or higher can be further added during the B block copolymerization. Adding this Lewis acid allows the polymerization to be sped up, thereby enabling a desired block copolymer to be obtained in a short amount of time.

For example, when an above-described alkenyl ether in a form which is protected by an ester or a silyl ether or an alkenyl ether comprising a functional group having a non-cationic polymerizable (the exemplified compounds are polymerizable with a radical or an anion), which belong to a category in which the ordinary polymerization reaction rate is comparatively slow, is used as the B block component, remarkable effects can be achieved. In some cases, it is possible to obtain a block copolymer having a structure which cannot be synthesized using a conventional process.

An example of a typical polymerization process will now be described. Briefly, such a process uses as the Lewis acid an alkylaluminum compound of general formula (III) during A block copolymerization, and then during B block copolymerization tin tetrachloride is added to thereby speed up the polymerization rate of the B component. From these steps an AB block copolymer can be produced. To shorten the polymerization time from A block copolymerization, two Lewis acids can be used in combination, although in such cases polymerization is preferably carried out by using the former Lewis acid to activate the initiating species, and then adding the latter Lewis acid simultaneously or later.

Block copolymers which can be produced according to the present invention will now be described, although obviously the present invention is not limited to these examples. Further, in some cases the structure of the block copolymer is such that the protective group has been deprotected. In particular, a carboxylic acid or sulfonic acid ester can be transformed into an ionic functional group (in this case anionic) by deprotecting the carboxylic acid or sulfonic acid ester through hydrolysis and then making the resulting product alkaline. Ionic groups such as an ammonium cation can also be introduced. Thus, a block copolymer compound having an ionic functional group as a repeating unit can be easily produced by employing a protective-group containing monomer, or directly polymerizing a monomer having an ionic functional group.

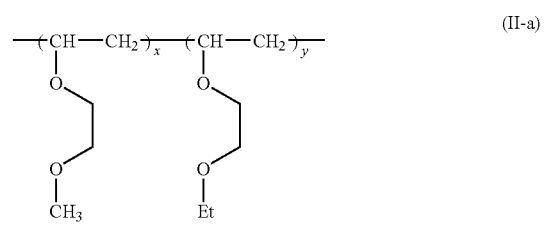
(II-a)

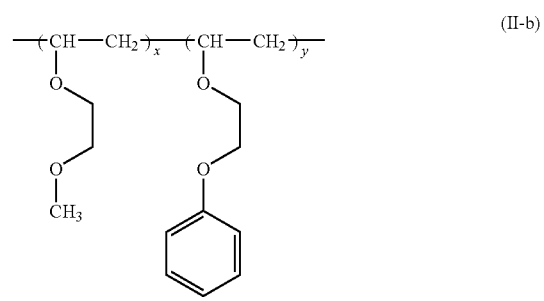
(II-b)

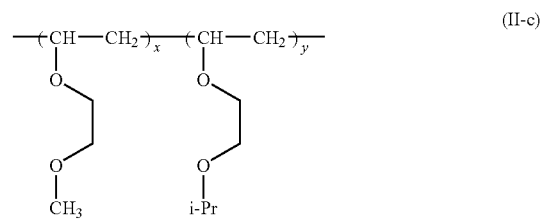
(II-c)

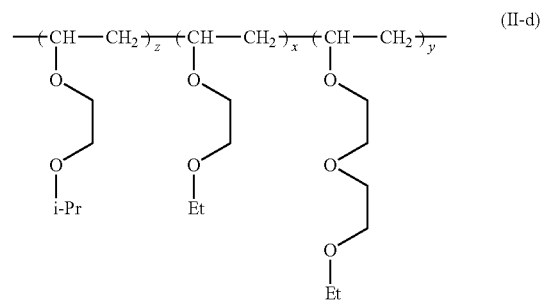
(II-d)

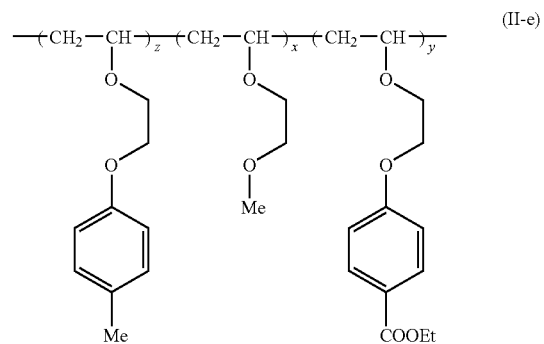
(II-e)

-continued

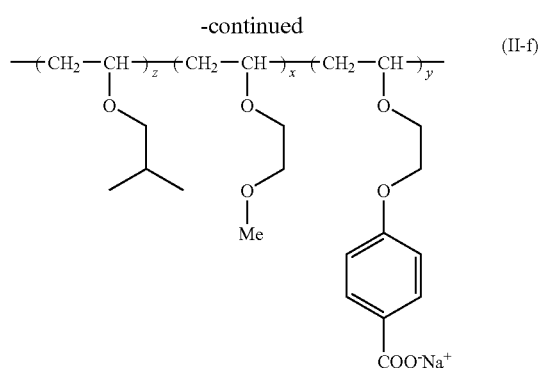

Next, the present invention will be explained in more detail by means of Examples.

Example 1

An example in which alkenyl ether represented by the above-described general formula (II) was polymerized using two Lewis acids will now be described.

A vessel (vessel 1) was charged with 10 ml of well-purified toluene and 2 ml of ethyl acetate under a nitrogen atmosphere, and the resulting solution was stirred until it was uniform. A separate vessel (vessel 2) was subsequently charged with 4 ml of toluene and 1 ml of a solution consisting of isobutoxyethyl acetate ($CH_3CH(OCH_2CH(CH_3)_2)OCOCH_3$:IBEA) in hexane prepared to 0.2 mol/l, and the resulting solution was stirred until it was uniform. Vessel 1 was then charged with 2 ml of this solution. Another vessel (vessel 3) was subsequently charged with 12 ml of toluene and 0.5 ml of a solution of ethylaluminum dichloride in hexane prepared to 1.0 M, and the resulting solution was stirred until it was uniform. Vessel 1 was then charged with 2 ml of this solution. The solution in vessel 1 was stirred until uniform, after which 4 ml was collected and introduced into a separate vessel (vessel 4). The introduced solution was cooled to 0° C. The cooled vessel 4 was subsequently charged with 0.5 ml of isobutyl vinyl ether (IBVE) which had been similarly cooled to 0° C., and the resulting solution was stirred until it was uniform. Another vessel (vessel 5) was subsequently charged with 9.5 ml of toluene and 0.5 ml of a solution of tin tetrachloride in hexane prepared to 1.0 M, and the resulting solution was stirred until it was uniform. Vessel 1 was then charged with 2 ml of this solution, and this resulting solution was cooled to 0° C. After one minute, this cooled solution was charged with 0.5 ml of the cooled solution of vessel 5. The resulting solution was stirred until uniform, to thereby initiate polymerization which was continued for 30 seconds. All the vessels that were employed were glass vessels equipped with a three-way stopcock, which had been purged with nitrogen and then heated under a nitrogen gas atmosphere to 250° C. for maximum removal of adsorbed water.

The respective component concentrations when polymerization was initiated were as follows.

[IBVE]=0.78 M, [IBEA]=4 mM, [$EtAlCl_2$]=4 mM, [$SnCl_4$]=5 mM, [AcOEt]=1.0 mM

Polymerization was later terminated using methanol containing a small amount of ammonia water. The terminated mixture was washed with aqueous hydrochloric acid (5 to 10 vol %) and water, for removal of catalyst residue. Solvent etc. was then evaporated off and the generated product was recovered.

The results showed a conversion ratio of 57%, Mn of 10,900 and Mw/Mn of 1.05. The polymer molecular weight was calculated by gel permeation chromatography (GPC: polystyrene conversion) using the below instruments. The instruments used were column a TSK gel G-4000 Hx1, G-3000 Hx1 and G-2000 Hx 1 manufactured by Tosoh Corporation, in which a UV-8020 detector or a RI-8020 detector was used. Chromatography was carried out using chloroform as the mobile phase, under conditions of 40° C. and a flow rate of 1.0 ml/min. Unless otherwise stated, determination of the molecular weight and molecular weight distribution were as carried out under these conditions. Compound identification by nuclear magnetic resonance spectrum (NMR) was performed using a JEOL JNM-EX 270 manufactured by JEOL Ltd., or a DPX-400 or AVANCE 500 manufactured by Bruker Biospin Corp. Unless otherwise stated, measurement was carried out using one of these apparatuses.

Example 2

An example in which alkenyl ether represented by the above-described general formula (II) was polymerized using two Lewis acids will now be illustrated.

Except for the polymerization time being set to 2 minutes, polymerization was carried out in exactly the same manner as in Example 1.

The results showed a conversion ratio of 100%, Mn of 18,100 and Mw/Mn of 1.03.

Comparative Example 1

Polymerization was carried out in exactly the same manner as in Example 1, except that ethyl aluminum dichloride prepared to 1.0 M was used in place of the 1.75 ml solution of tin tetrachloride in hexane prepared to 1.0 M using the process of Example 2, and that the polymerization time was set to 48 hours.

The respective component concentrations when polymerization was initiated were as follows.

[IBVE]=0.78 M, [IBEA]=4 mM, [$EtAlCl_2$]=4+5 mM, [AcOEt]=1.0 M

The results showed a conversion ratio of 90%, Mn of 15,300 and Mw/Mn of 1.07. Although a polymer was obtained on a par with that in Example 2, 48 hours was required in Comparative Example 1 for the reaction, compared with about 1 minute 30 seconds in Example 2.

Example 3

An example in which alkenyl ether represented by the above-described general formula (II) was polymerized using two Lewis acids will now be illustrated.

Except for the ethyl acetate being changed to ethyl chloroacetate and the polymerization time being set to 2 seconds, polymerization was carried out in exactly the same manner as in Example 1. The results showed a conversion ratio of 99%, Mn of 20,900 and Mw/Mn of 1.03.

Example 4

An example in which alkenyl ether represented by the above-described general formula (II) was polymerized using two Lewis acids will now be illustrated.

Except for the isobutyl vinyl ether being changed to 4-(2-vinyloxyethoxy)benzoic acid ethyl ester (CH$_2$=CHOCH$_2$CH$_2$O-(p-C$_6$H$_4$—COOEt):EBVE) as the monomer, polymerization was carried out in exactly the same manner as in Example 1.

The respective component concentrations when polymerization was initiated were as follows.

[EBVE]=0.8 M, [IBEA]=4 mM, [EtAlCl2]=8 mM, [SnCl4]=5 mM, [AcOEt]=1.0 M

Polymerization was terminated 30 seconds after polymerization initiation.

The results showed a conversion ratio of 42%, Mn of 9,500 and Mw/Mn of 1.03.

Example 5

An example in which alkenyl ether represented by the above-described general formula (II) was polymerized using two Lewis acids will now be illustrated.

Except for the polymerization time being set to 4 minutes, polymerization was carried out in exactly the same manner as in Example 3.

The results showed a conversion ratio of 90%, Mn of 16,600 and Mw/Mn of 1.02.

Comparative Example 2

Polymerization was carried out in exactly the same manner as in Example 1, except that ethyl aluminum dichloride prepared to 1.0 M was used in place of the 1.75 ml solution of tin tetrachloride in hexane prepared to 1.0 M using the process of Example 2, and that the polymerization time was set to 50 hours.

The respective component concentrations when polymerization was initiated were as follows.

[EBVE]=0.8 M, [IBEA]=4 mM, [EtAlCl2]=8+5 mM, [AcOEt]=1.0 M

The results showed a conversion ratio of 85% at 50 hours.

Example 6

An example in which alkenyl ether represented by the above-described general formula (I) was polymerized using one kind of Lewis acid will now be illustrated.

A vessel equipped with a three-way stopcock was charged under a nitrogen atmosphere with well-purified toluene, ethyl acetate (1.0 M), a hydrogen chloride adduct of isobutyl vinyl ether (IBEC: 4 mM), and benzoxyethyl vinyl ether (0.6 M), and the resulting solution was cooled to 0° C. The cooled solution was charged with a solution of tin tetrachloride in toluene (5 mM) to thereby initiate polymerization. Polymerization was terminated after 90 seconds by charging the solution with methanol comprising a small amount of ammonia water. The terminated mixture was washed with water, whereby catalyst residue was removed. Solvent etc. was then evaporated off and the generated product was recovered. The results showed a conversion ratio of 94%, Mn of 30,000 and Mw/Mn of 1.05. The polymer molecular weight was calculated by GPC in the same manner as in Example 1.

Example 7

An example in which alkenyl ether represented by the above-described general formula (I) was polymerized using one kind of Lewis acid will now be illustrated.

Except for ferric chloride (5 mM) being used for tin tetrachloride as the Lewis acid, dioxane (1.2 M) being used for ethyl acetate as the Lewis base and the polymerization time being set to 10 seconds, polymerization was carried out in exactly the same manner as in Example 6.

The results showed a conversion ratio of 97%, Mn of 28,000 and Mw/Mn of 1.07.

Example 8

An example in which alkenyl ether represented by the above-described general formula (II) was polymerized using two Lewis acids will now be illustrated.

Polymerization was carried out according to Example 1 in the following manner. Polymerization was carried out under a dry nitrogen atmosphere in a well-dried glass vessel equipped with a three-way stopcock. The vessel was charged at room temperature with 0.02 millimoles of 1-isobutoxyethyl acetate, 5.7 millimoles of ethyl acetate, and 4 ml of toluene. The vessel was further charged with 0.05 millimoles of ethylaluminum dichloride, and the resulting solution was mixed. This solution was then left for 30 minutes, whereby a reaction initiator species was formed. The system contents were subsequently cooled at 0° C. for 10 minutes, and then charged with 4.0 millimoles of 2-vinyloxyethoxyethyl acrylate (VEEA). The resulting solution was further charged with 0.025 millimoles of tin tetrachloride, to thereby initiate polymerization. Polymerization was carried out for 6 minutes. The polymerization reaction was then terminated by charging the reaction solution with 3 ml of a 0.5 wt % ammonia/methanol solution. Dichloromethane was introduced into the mixed solution which had finished reaction, and the resulting solution was washed with dilute hydrochloric acid (3 times), aqueous sodium hydroxide (once) and brine (4 times), whereby initiator residue was removed. An evaporator was then used to concentrate and solidify the remaining solution, and this resulting product was subjected to vacuum drying to thereby yield the desired polymer.

Gas chromatography (GC) analysis of the terminated reaction solution showed that the monomer conversion ratio was 97%. The molecular weight of the yielded polymer was calculated by gel permeation chromatography (GPC: polystyrene conversion). Chromatography was carried out using chloroform as the mobile phase, under conditions of 40° C. and a flow rate of 0.6 ml/min. The instruments used were two columns of TSK gel Super H2M-M and HLC-8220 GPC manufactured by Tosoh Corporation. The yielded number average molecular weight Mn was 21,700 and the molecular weight distribution Mw/Mn was 1.3.

1H-NMR measurement of the yielded polymer (measurement solvent: deuterated chloroform; instrument: 400 MHz 1H-NMR manufactured by Varian Inc.) confirmed the following. That is, it was confirmed that acryloyl groups were present, that the vinyl ether groups had been selectively polymerized, and that an acryloyl group pendant polymer having a radical polymerizable double bond was formed on a side chain.

Example 9

An example in which alkenyl ether represented by the above-described general formula (II) was polymerized using two Lewis acids will now be illustrated.

Polymerization was carried out according to Example 1 in the following manner. A well-dried glass vessel equipped with a three-way stopcock was purged with nitrogen and then heated under a nitrogen gas atmosphere to 250° C. for maximum removal of adsorbed water. Once the system had cooled to room temperature, the vessel was charged with 100 mmol (millimoles) of paramethylphenyloxyethyl vinyl ether, 253 mmol of ethyl acetate, 1.1 mmol of 1-isobutoxyethyl acetate, and 176 ml of toluene. The reaction system was cooled, and once the system temperature had reached 0° C., the vessel was further charged with 5.0 mmol of ethylaluminum sesquichloride (equimolar mixture of diethylaluminum chloride and ethylaluminum dichloride), to thereby initiate polymerization. Molecular weight was monitored on a time-division basis using molecular sieve column chromatography (GPC), wherein once the conversion of the A block monomer to the polymer was completed, 30 mmol of the next block component of a solution of ethyl 4-(2-vinyloxyethoxy)benzoate in toluene was subsequently introduced into the vessel. This was immediately followed by charging the resulting solution with 1.25 mmol of the tin tetrachloride solution used in Example 1.

The resulting solution temperature was raised to 20° C. and polymerization was continued. After 20 minutes, the polymerization reaction was terminated by charging the system with a 0.3 mass % solution of aqueous ammonia/methanol. The reaction mixture solution was diluted with dichloromethane, and the resulting diluted solution was washed with 0.6 M hydrochloric acid (3 times), and then with distilled water (3 times). The obtained organic phase was reprecipitated to an aqueous methanol solution, to thereby yield the desired diblock copolymer.

Compound identification was carried out by similarly using NMR and GPC.

Mn was 15,200, and Mw/Mn was 1.09. The polymerization ratio was A:B=88:14.

This polymer was charged in DMF with 10% aqueous sodium hydroxide in an amount equivalent to 5 times the carboxylic acid ester, and the resulting solution was subjected to hydrolysis at room temperature for 24 hours. The reaction solution was repeatedly subjected to dialysis in a methanol solvent using a cellulose semipermeable membrane, whereby DMF, low molecular weight byproducts and excess alkali were removed, to thereby yield an anionic diblock copolymer of a carboxylic acid sodium salt in which the ester had been hydrolyzed. Compound identification was carried out using NMR.

Example 10

An example in which alkenyl ether represented by the above-described general formula (II) was polymerized using two Lewis acids will now be illustrated.

The polymerization reaction was carried out under a dry nitrogen atmosphere in a well-dried glass vessel equipped with a three-way stopcock. The vessel was charged at room temperature with 0.02 millimoles of 1-isobutoxyethyl acetate, 5.7 millimoles of ethyl acetate, and 4.2 ml of toluene. The vessel was further charged with 0.05 millimoles of ethylaluminum dichloride, and the resulting solution was mixed. This solution was then left for 30 minutes, whereby a reaction initiator species was formed. The system contents were subsequently cooled at 0° C. for 10 minutes, and then charged with 4.0 millimoles of 2-vinyloxyethoxyethyl acrylate (VEEA). The resulting solution was further charged with 0.025 millimoles of tin tetrachloride, to thereby initiate polymerization. Polymerization was carried out for 7 minutes. Without terminating the reaction, the vessel was then charged with 4.0 millimoles of isobutyl vinyl ether (IBVE), and the resulting solution was further charged with 0.025 millimoles of tin tetrachloride. Polymerization was carried out for 10 minutes, and then the polymerization reaction was terminated by charging the reaction solution with 3 ml of a 0.5 wt % ammonia/methanol solution. Dichloromethane was introduced into the mixed solution which had finished reaction, and the resulting mixture was washed with dilute hydrochloric acid (3 times), aqueous sodium hydroxide (once) and brine (4 times), whereby initiator residue was removed. An evaporator was then used to concentrate and solidify the remaining solution, and this resulting product was subjected to vacuum drying to thereby yield the desired polymer.

The molecular weight of the yielded polymer was calculated by gel permeation chromatography (GPC: polystyrene conversion) using two columns of TSK gel Super H2M-M and HLC-8220 GPC manufactured by Tosoh Corporation, in which chloroform served as the mobile phase, under conditions of 40° C. and a flow rate of 0.6 ml/min. The number average molecular weight Mn was 34,600 and the molecular weight distribution Mw/Mn was 1.3.

1H-NMR measurement of the yielded polymer (measurement solvent: deuterated chloroform; instrument: 400 MHz 1H-NMR manufactured by Varian Inc.) confirmed that the polymer ratio was VEEA:IBVE=100:87. Further, it was similarly confirmed that acryloyl groups were present, that the vinyl ether groups had been selectively polymerized, and that an acryloyl group pendant polymer having a radical polymerizable double bond was formed on a side chain.

Example 11

An example in which alkenyl ether represented by the above-described general formula (II) was polymerized using two Lewis acids will now be illustrated.

Polymerization was carried out according to Example 1 in the following manner. Polymerization was carried out under a dry nitrogen atmosphere in a well-dried glass vessel equipped with a three-way stopcock. The vessel was charged at room temperature with 0.02 millimoles of 1-isobutoxyethyl acetate, 5.1 millimoles of ethyl acetate, and 4.2 ml of toluene. The vessel was further charged with 0.05 millimoles of ethylaluminum dichloride, and the resulting solution was mixed. This solution was then left for 30 minutes, whereby a reaction initiator species was formed. The system contents were subsequently cooled at 0° C. for 10 minutes, and then charged with a mixed solution consisting of 2.0 millimoles of VEEA and 2.0 millimoles of IBVE. The resulting solution was further charged with 0.025 millimoles of tin tetrachloride, to thereby initiate polymerization. Polymerization was carried out for 10 minutes, and then terminated by charging the reaction solution with 3 ml of an ammonia/methanol solution. Dichloromethane was introduced into the mixed solution which had finished reaction, and the resulting mixture was washed with dilute hydrochloric acid (3 times), aqueous sodium hydroxide (once) and brine (4 times), whereby initiator residue was removed. An evaporator was then used to concentrate and solidify the remaining solution, and this resulting product was subjected to vacuum drying to thereby yield the desired polymer.

Gas chromatography (GC) analysis of the terminated reaction solution showed that the monomer conversion ratio for VEEA was 100% and for IBVE was 100%. The molecular weight of the yielded polymer was calculated by gel permeation chromatography (GPC: polystyrene conversion) using two columns of TSK gel Super H2M-M and HLC-8220 GPC manufactured by Tosoh Corporation, in which chloroform served as the mobile phase, under conditions of 40° C. and a flow rate of 0.6 ml/min. The yielded number average molecular weight Mn was 26,400 and the molecular weight distribution Mw/Mn was 1.3.

1H-NMR measurement of the yielded polymer (measurement solvent: deuterated chloroform; instrument: 400 MHz 1H-NMR manufactured by Varian Inc.) confirmed that acryloyl groups were present, that the vinyl ether groups had been selectively polymerized, and that an acryloyl group pendant polymer having a radical polymerizable double bond was formed on a side chain.

Comparative Example 3

A polymerization reaction was carried out under a dry nitrogen atmosphere in a well-dried glass vessel equipped with a three-way stopcock. The vessel was charged at room temperature with 0.02 millimoles of 1-isobutoxyethyl acetate, 5.1 millimoles of ethyl acetate, and 3.6 ml of toluene. The vessel was further charged with 0.045 millimoles of ethylaluminum dichloride, and the resulting solution was mixed. This solution was then left for 30 minutes, whereby a reaction initiator species was formed. The system contents were subsequently cooled at 0° C. for 10 minutes, and then charged with 4.0 millimoles of VEEA. In place of tin tetrachloride, the resulting solution was further charged with 0.023 millimoles of ethylaluminum dichloride. Polymerization was carried out for 30 minutes. The polymerization reaction was then terminated by charging the reaction solution with 3 ml of a 0.5 wt % ammonia/methanol solution. Dichloromethane was introduced into the mixed solution which had finished reaction, and the resulting mixture was washed with dilute hydrochloric acid (3 times), aqueous sodium hydroxide (once) and brine (4 times), whereby initiator residue was removed. An evaporator was then used to concentrate and solidify the remaining solution, and this resulting product was subjected to vacuum drying to thereby yield the desired polymer.

Gas chromatography (GC) analysis of the terminated reaction solution showed that the monomer conversion ratio was 53%, whereby it was learned that the reaction ratio was lower than that for the case of tin tetrachloride. The molecular weight of the yielded polymer was calculated by gel permeation chromatography (GPC: polystyrene conversion) using two columns of TSK gel Super H2M-M and HLC-8220 GPC manufactured by Tosoh Corporation, in which chloroform served as the mobile phase, under conditions of 40° C. and a flow rate of 0.6 ml/min. The yielded number average molecular weight Mn was 25,200 and the molecular weight distribution Mw/Mn was 3.1.

Example 12

Here, a preparation example of ink in which a coloring material was dispersed in the dispersion medium using the block copolymer yielded by the process according to the present invention will now be described.

Six parts by mass of the anionic diblock copolymer synthesized in Example 9 and 6 parts by mass of copper phthalocyanine pigment (coloring material) (C.I. Pigment Blue—15:3, manufactured by Toyo Ink Mfg. Co., Ltd.) were dissolved into 90 parts by mass of tetrahydrofuran (solvent). The resulting solution was kept in an ultrasound dispersion apparatus for 20 minutes, then converted in-situ to an aqueous phase using 150 parts by mass of distilled water (dispersion medium), to thereby yield a dispersion solution. The tetrahydrofuran was then distilled off under reduced pressure to yield an ink composition. Coarse particles were removed using a 2 micron membrane filter. These particles were then charged with 13 parts by weight of glycerin and 12 parts by weight of ethylene glycol, to thereby form into an ink composition. The dispersion was stable, and even after being left for 20 days no precipitated matter could be visually observed. When this ink was printed using the inkjet recording unit BJF600 (Tradename) manufactured by Canon Inc., a clean recording was achieved.

This application claims priority from Japanese Patent Application No. 2004-054878 filed on Feb. 28, 2005, which is hereby incorporated by reference herein.

What is claimed is:

1. A process for producing a polyalkenyl ether by polymerizing an alkenyl ether represented by general formula (II):

$$CHR^1=CH(OR^2) \quad (II),$$

where $R^1$ represents a hydrogen atom or a methyl group, and $R^2$ represents a monovalent organic group, using a cation source in the presence of first and second Lewis acids wherein the first and the second Lewis acids are different, and an oxygen-containing or nitrogen-containing organic compound, the process comprising the steps of:

mixing the cation source and the first Lewis acid to generate initiator cations; and subsequently adding the alkenyl ether represented by the general formula (II) and the second Lewis acid for initiating a high-speed polymerization reaction, wherein the first Lewis acid is a halide or an organometallic compound of an element selected from the group consisting of Mg, B, Al, Si, and P, the second Lewis acid is a halide or an organometallic compound of an element of the fourth period or higher in the periodic table, and the cation source is a proton acid, water, an alcohol, a halide, a hydrogen halide, or an adduct of a carboxylic acid and a vinyl ether, wherein the alkenyl ether represented by the general formula (II) and the first Lewis acid are used at a molar ratio in a range of 10 to 1000, and wherein the alkenyl ether represented by the general formula (II) and the second Lewis acid are used at a molar ratio in a range of 10 to 1000.

2. The process according to claim 1, wherein the first Lewis acid is an organoaluminum compound represented by general formula (III):

$$R^3{}_m AlX_n \quad (III),$$

wherein $R^3$ represents a monovalent organic group and X represents a halogen atom, while m and n are numbers satisfying m+n=3, $0 \leq m \leq 3$ and $0 \leq n \leq 3$.

3. The process according to claim 1, wherein the alkenyl ether has a radical polymerizable and/or anion polymerizable reactive unsaturated bond in the molecule.

4. The process according to claim 3, wherein the alkenyl ether is an ester represented by general formula (IV):

$$CHR^{11}=CHO-R^{12}-OC(=O)-CR^{13}=CHR^{14} \quad (IV),$$

wherein $R^{11}$ represents a hydrogen atom or a methyl group, $R^{12}$ represents an organic group, $R^{13}$ represents a hydrogen atom or a methyl group, and $R^{14}$ represents a hydrogen atom or an organic group.

5. A process for producing a block copolymer comprising the process according to any of claims 2, 3, and 4.

6. A process for a producing polyalkenyl ether containing an ionic repeating unit structure comprising the production process according to any of claims 2, 3, and 4.

7. A process for producing an ink obtained by dispersing a coloring material in a dispersion medium using a block copolymer obtained by the process according to claim 5.

* * * * *